United States Patent
Yamamoto et al.

(10) Patent No.: US 9,041,261 B2
(45) Date of Patent: May 26, 2015

(54) ROTATING ELECTRICAL MACHINE HAVING RADIAL COMMUNICATION PASSAGES IN PERMANENT MAGNET ROTOR

(75) Inventors: Yoshihisa Yamamoto, Anjo (JP); Shinichi Otake, Kota (JP); Takamasa Takeuchi, Anjo (JP); Masatoshi Sugimoto, Anjo (JP); Satoshi Murakami, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 385 days.

(21) Appl. No.: 13/541,291

(22) Filed: Jul. 3, 2012

(65) Prior Publication Data

US 2013/0020889 A1    Jan. 24, 2013

(30) Foreign Application Priority Data

Jul. 19, 2011  (JP) .................................. 2011-157991

(51) Int. Cl.
*H02K 1/27*    (2006.01)
*H02K 1/32*    (2006.01)
(Continued)

(52) U.S. Cl.
CPC ............... *H02K 1/2766* (2013.01); *H02K 1/27* (2013.01); *H02K 9/00* (2013.01); *H02K 9/197* (2013.01); *H02K 1/32* (2013.01)

(58) Field of Classification Search
CPC ......... H02K 1/27; H02K 1/2766; H02K 1/32; H02K 9/00; H02K 9/197
USPC .......... 310/52, 54, 58, 59, 61, 156.53, 156.56
IPC ................................................ H02K 1/27, 1/32
See application file for complete search history.

(56) References Cited

U.S. PATENT DOCUMENTS 890,577 A  *  6/1908  Richards .......................... 310/65
5,859,483 A  *  1/1999  Kliman et al. ................... 310/58
(Continued)

FOREIGN PATENT DOCUMENTS

JP    U-61-165055    10/1986
JP    A-63-181644    7/1988
(Continued)

OTHER PUBLICATIONS

JP2006-06777_EN, Ogawa et al, English machine translation of JP 2006-06777, 2006.*
(Continued)

*Primary Examiner* — John K Kim
(74) *Attorney, Agent, or Firm* — Oliff PLC (57) ABSTRACT

A rotating electrical machine includes a rotor which has a rotor core formed by stacking magnetic plates having an annular plate shape in an axial direction, a permanent magnet is inserted into a magnet insertion hole formed in the rotor core, and a rotor shaft is inserted into a shaft insertion hole surrounded by an inner peripheral surface of the rotor core; and a stator. A radial communication passage is formed by a communication penetration hole group that is formed by sequentially communicating a plurality of the penetration holes from a shaft insertion hole to a magnetic resistance hole in the radial direction. The plurality of the penetration holes are divided into at least two specific magnetic plates and formed such that the radial positions of the penetration holes are different from each other and the penetration holes partially overlap each other when viewed in the axial direction.

18 Claims, 6 Drawing Sheets

(51) Int. Cl.
  *H02K 9/00* (2006.01)
  *H02K 9/197* (2006.01)

(56) References Cited

U.S. PATENT DOCUMENTS

| | | | |
|---|---|---|---|
| 5,986,366 A * | 11/1999 | Bailey et al. | 310/52 |
| 6,727,609 B2 * | 4/2004 | Johnsen | 310/52 |
| 8,242,646 B2 * | 8/2012 | Tatematsu et al. | 310/61 |
| 8,362,661 B2 * | 1/2013 | DeBlock et al. | 310/59 |
| 2004/0145263 A1 * | 7/2004 | Kojima et al. | 310/156.23 |
| 2009/0134732 A1 | 5/2009 | Shichijoh et al. | |
| 2013/0020889 A1 * | 1/2013 | Yamamoto et al. | 310/59 |

FOREIGN PATENT DOCUMENTS

| | | |
|---|---|---|
| JP | A-2006-67777 | 3/2006 |
| JP | A-2008-228522 | 9/2008 |
| JP | A-2009-055737 | 3/2009 |
| JP | A-2009-72052 | 4/2009 |
| JP | A-2009-124899 | 6/2009 |
| JP | 2010-063253 A | 3/2010 |
| JP | 4664737 | 1/2011 |

OTHER PUBLICATIONS

Sep. 18, 2012 International Search Report issued in International Application No. PCT/JP2012/065517 (with translation).

* cited by examiner

ROTATING ELECTRICAL MACHINE HAVING RADIAL COMMUNICATION PASSAGES IN PERMANENT MAGNET ROTOR

INCORPORATION BY REFERENCE

The disclosure of Japanese Patent Application No. 2011-157991 filed on Jul. 19, 2011 including the specification, drawings and abstract is incorporated herein by reference in its entirety.

BACKGROUND OF THE INVENTION

The present invention relates to a rotating electrical machine that includes a rotor which has a rotor core formed by stacking a plurality of magnetic plates having an annular plate shape in an axial direction, a permanent magnet inserted into a magnet insertion hole formed in the rotor core and a rotor shaft inserted into a shaft insertion hole surrounded by an inner peripheral surface of the rotor core; and a stator.

DESCRIPTION OF THE RELATED ART

As a related art of the rotating electrical machine as mentioned above, for example, there is a technique described in Japanese Patent Application Publication No. 2009-124899 (JP 2009-124899 A) as described below. Hereinafter, in the description of the column of the background art, reference numerals (including names of the corresponding member, as necessary) in JP 2009-124899 A will be cited and described in [ ]. In the configuration described in JP 2009-124899 A, a configuration is described in which a non-magnetic portion [a non-magnetic portion 18 between a segment and a yoke] is provided in the vicinity of permanent magnets [11 and 12] in a rotor core [10]. Such a non-magnetic portion is, for example, formed by a hole (a space), and functions as a magnetic resistance with respect to a magnetic flux flowing in the rotor core.

However, when the heat generation of the permanent magnet provided in the rotor core proceeds excessively, there is a concern that the permanent magnet may cause irreversible demagnetization. Thus, there is a need to suitably suppress a temperature rise of the permanent magnet. However, JP 2009-124899 A does not describe a cooling mechanism of the permanent magnet, and, of course, a cooling mechanism is not known yet which is suitable for the rotor core in which the strength tends to decrease by providing the non-magnetic portion.

SUMMARY OF THE INVENTION

Thus, it is desirable to realize a rotating electrical machine that is capable of effectively cooling a permanent magnet while suitably securing the strength of a rotor core.

A rotating electrical machine according to a first aspect of the present invention includes a rotor which has a rotor core formed by stacking a plurality of magnetic plates having an annular plate shape in an axial direction, a permanent magnet which is inserted into a magnet insertion hole formed in the rotor core, and a rotor shaft which is inserted into a shaft insertion hole surrounded by an inner peripheral surface of the rotor core; and a stator. The rotor includes a plurality of magnet poles which is constituted by the permanent magnet, extends in the axial direction, and is arranged dispersed in a circumferential direction, the rotor core includes a plurality of magnetic resistance holes which is formed corresponding to respective magnetic poles so as to extend in the axial direction and functions as the magnetic resistance to the magnetic flux flowing in the rotor core, and a radial communication passage which extends in a radial direction so as to communicate each of the plurality of magnetic resistance holes and the shaft insertion hole, a specific magnetic plate, which is a portion of the plurality of magnetic plates constituting the rotor core, includes a penetration hole which is formed in a radial region between the shaft insertion hole and the magnetic resistance hole and penetrates in the axial direction, and the radial communication passage is formed by a communication penetration hole group that is formed by sequentially communicating a plurality of the penetration holes from the shaft insertion hole to the magnetic resistance hole in the radial direction, the plurality of the penetration holes formed divided into at least the two specific magnetic plates and formed such that the radial positions of the penetration holes are different from each other and the penetration holes partially overlap each other when viewed in the axial direction.

In the present application, the "rotating electrical machine" is used as a concept that includes any one of a motor (an electric motor), a generator (a power generator), and a motor/generator acting as both of the motor and the generator as necessary.

According to the above configuration, since a refrigerant can be supplied to the magnetic resistance hole via the radial communication passage by supplying the refrigerant to an inner peripheral surface of the shaft insertion hole, the permanent magnet can be indirectly cooled by the heat exchange between the refrigerant in the magnetic resistance hole and the rotor core. At this time, since the magnetic resistance hole is a hole portion that is provided for acting as the magnetic resistance to the magnetic flux flowing in the rotor core, the magnetic resistance hole is provided in a position that is relatively close to the permanent magnet, and the inner portion of the hole portion is basically a portion that does not constitute the magnetic circuit. Thus, it is possible to effectively cool the permanent magnet by flowing the refrigerant in the position relatively close to the permanent magnet, while suppressing the influence of the refrigerant on the magnetic circuit to suitably secure performance of the rotating electrical machine. Furthermore, since the refrigerant can be supplied to each of the plurality of magnetic resistance holes formed corresponding to the plurality of magnetic poles via the radial communication passage, it is possible to uniformly perform the cooling of the permanent magnets for each of the magnetic poles.

In addition, according to the above configuration, since the radial communication passage is constituted by a group (the communication penetration hole group) of the penetration holes formed divided into at least the two specific magnetic plates, it is possible to reduce the size (particularly, the size in the radial direction) of the penetration holes formed in each specific magnetic plate, compared to a case where the radial communication passage is formed only by one magnetic plate. Thus, the radial communication passage can be formed while suitably securing the strength of the each specific magnetic plate constituting the rotor core.

The plurality of magnetic plates constituting the rotor core may include the specific magnetic plate, and a normal magnetic plate that is different from the specific magnetic plate, the normal magnetic plate may have a blocking portion that blocks the penetration hole in a position overlapping with the penetration hole when viewed in the axial direction, the communication penetration hole group may be formed by a specific magnetic plate group which is formed by stacking at least the two specific magnetic plates in the axial direction, and the normal magnetic plate is placed on both sides of the specific magnetic plate group in the axial direction such that the specific magnetic plate group is interposed between the normal magnetic plates, and the number of normal magnetic plates may be greater than that of specific magnetic plates.

According to this configuration, the radial communication passage can be suitably partitioned in the axial direction, and the strength of the rotor core can be easily secured.

Furthermore, the one radial communication passage may be formed for each of the plurality of magnetic resistance holes in a center portion in the axial direction of the rotor core.

According to this configuration, since the radial communication passage is formed in the center portion in the axial direction of the rotor core, it is possible to intensively cool the center portion in the axial direction of the rotor core, in which heat is easily trapped, and it is possible to evenly cool the rotor core on both sides thereof in the axial direction, by flowing the refrigerant from a center portion in the axial direction of the magnetic resistance hole toward both sides thereof in the axial direction.

Furthermore, since the one radial communication passage is formed for each of the plurality of magnetic resistance holes, it is possible to form the radial communication passage by a simple and easy configuration, and the strength of the rotor core is also easily secured.

Furthermore, each of the penetration holes may be formed in a portion of a radial region between the shaft insertion hole and the magnetic resistance hole, the communication penetration hole group may include an inner opening penetration hole as the penetration hole which is open radially inward and communicates with the shaft insertion hole, and an outer opening penetration hole as the penetration hole which is open radially outward and communicates with the magnetic resistance hole, and the inner opening penetration hole and the outer opening penetration hole may be formed in the different specific magnetic plates.

According to this configuration, compared to a ease where the inner opening penetration hole and the outer opening penetration hole are formed in the same specific magnetic plate, it is easy to suitably ensure the strength of the respective specific magnetic plates.

Furthermore, a shape of the penetration hole when viewed in the axial direction may be any one of a circular shape, an elliptical shape, and a shape in which an arc is connected to a straight line.

According to this configuration, the stress which may be generated in a portion where the penetration hole is formed due to the centrifugal force generated by the rotation of the rotor is easily relieved by a peripheral portion of the arc shape, whereby it is possible to suppress the concentration of the stress to improve the durability of the rotor core.

Furthermore, each of the plurality of magnetic poles may be constituted by the plurality of permanent magnets, and the magnetic resistance hole may be formed in a position at an equal distance from each of the plurality of permanent magnets constituting the corresponding magnetic pole.

According to this configuration, it is possible to uniformly cool the plurality of permanent magnets constituting each magnetic pole by a simple configuration.

Furthermore, the stator may include a stator core which is placed radially outward of the rotor core, and a coil end portion which projects from the stator core toward both sides in the axial direction of the stator core, and the magnetic resistance hole may have an end surface opening portion that is open to end surfaces of the rotor core on both sides in the axial direction of the rotator core.

According to this configuration, the coil end portion can be further cooled using the refrigerant after cooling the permanent magnet via the rotor core, whereby the entire rotating electrical machine can be effectively cooled.

DETAILED DESCRIPTION OF THE EMBODIMENTS

An embodiment of a rotating electrical machine according to the present invention will be described referring to the drawings. In the description mentioned below, unless otherwise noted, an "axial direction L", a "diameter direction R", and a "circumferential direction C" are defined using an axial center A of a rotor core 3 (a rotating electrical machine 1) as a reference (see FIGS. 1 and 2). In addition, a direction of each member indicates a direction in a state where the member is assembled in the rotating electrical machine 1. Furthermore, the descriptions concerning the directions and the positions of the member (for example, "parallel", "perpendicular" or the like) are used as concepts including the difference corresponding to manufacturing errors. The manufacturing errors are, for example, generated by the deviation in the range of tolerances of a size and an attachment position.

1. Overall Configuration of Rotating Electrical Machine

An overall configuration of the rotating electrical machine 1 will be described with reference to FIG. 1. The rotating electrical machine 1 includes a rotor 2 as a field magnet, a stator 4 as an armature, and a case 100 that accommodates the rotor 2 and the stator 4. The stator 4 is fixed to the case 100, and the rotor 2 is placed radially inward R1 of the stator 4 so as to be freely rotatable with respect to the stator 4.

The rotor 2 includes the rotor core 3, a permanent magnet 11, and a rotor shaft 10. Although the details will be described later, the rotor core 3 is configured by stacking a plurality of magnetic plates 50 having an annular plate shape (for example, a steel plate or the like, see FIGS. 6A and 6B or the like) in the axial direction L, and is formed in a cylindrical shape as a whole. The permanent magnet 11 is inserted into a magnet insertion hole 21 formed in the rotor core 3. The rotor shaft 10 is inserted into a shaft insertion hole 20 surrounded by an inner peripheral surface of the rotor core 3, and is connected (for example, connected by a shrink-fit, a key joining, or a spline joining or the like) so as to be integrally rotated with the rotor core 3. The rotor shaft 10 is placed so as to protrude from both sides of the rotor core 3 in the axial direction L, and is supported by bearings 90 on the both sides of the rotor core 3 in the axial direction L so as to be rotatable with respect to the case 100.

The rotor shaft 10 is formed in a cylindrical shape having a hollow portion provided radially inward R1, and an in-shaft flow path 81 is formed using the hollow portion. Furthermore, the rotor shaft 10 is provided with a radial penetration hole 82 for communicating the in-shaft flow path 81 with the outer peripheral surface of the rotor shaft 10 in the radial direction R. The in-shaft flow path 81 and the radial penetration hole 82 constitute a refrigerant supply portion 80 which supplies the inner peripheral surface of the shaft insertion hole 20 with the refrigerant supplied from a refrigerant supply source (for example, an oil pump or the like, not shown).

The stator 4 includes a stator core 5 and a coil end portion 6. The stator core 5 is placed radially outward R2 of the rotor core 3, and the inner portion of the stator core 5 is provided with a plurality of slots (not shown) at predetermined intervals along a circumferential direction C. Moreover, the coil end portion 6 is formed by a portion which projects from the stator core 5 in the axial direction L (on both sides in the axial direction L in the present example) in a coil wound around the slot.

2. Configuration of Rotor Core

Figure 2:
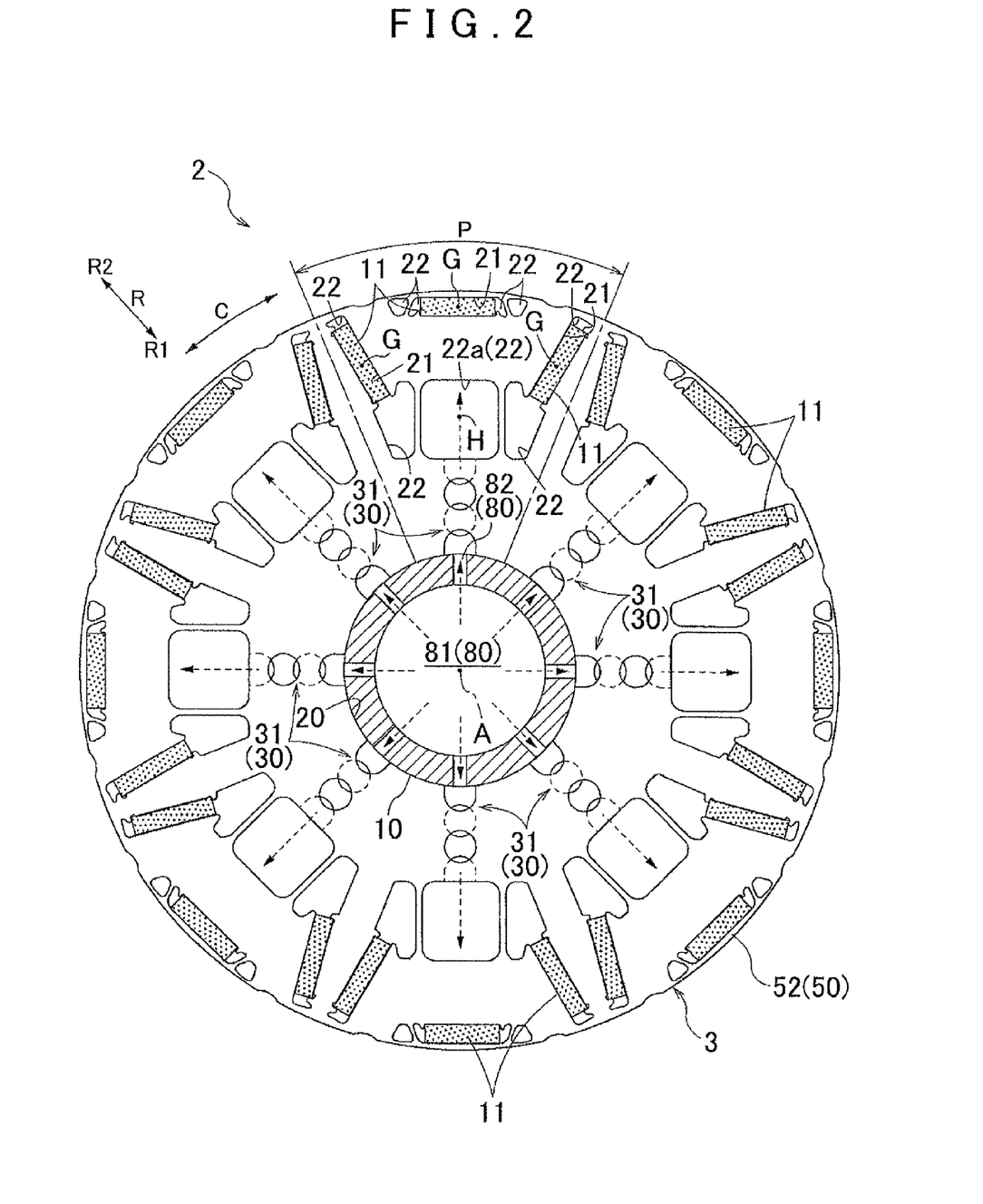
FIG. 2 is a cross-sectional view taken along line II-II in FIG. 1.

Next, a configuration of the rotor core 3 as a main portion of the present invention will be described. The rotor core 3 is formed with a plurality of magnetic poles that is constituted by the permanent magnet 11 and extends in the axial direction L so as to be distributed in the circumferential direction C. In the present example, as shown in FIG. 2, the number of magnetic poles of the rotor 2 is "8", and eight magnetic poles are placed at equal intervals along the circumferential direction C. In addition, in FIG. 2, a region (hereinafter, referred to as a "partition") in the circumferential direction C constituting one magnetic pole is indicated by a symbol "P". A plurality (eight in the present example) of partitions P is configured in the same manner except for the position of the circumferential direction C and the polarity direction of the permanent magnet 11. The rotor core 3 has a configuration in which a plurality (eight in the present example) of configurations of partitions P is arranged in the circumferential direction C.

Each of the plurality of magnetic poles is constituted by a single or plurality of permanent magnets 11. In the present embodiment, as shown in FIG. 2, each magnetic pole is constituted by a plurality of permanent magnets 11, specifically, three permanent magnets 11. Thus, in the present embodiment, each partition P is provided with three magnet insertion holes 21 for inserting the permanent magnet 11. The magnet insertion holes 21 are formed so as to extend in the axial direction L, and, in the present example, as shown in FIG. 1, the holes 21 are provided so as to penetrate the rotor core 3 in the axial direction L.

The rotor core 3 is provided with a magnetic resistance hole 22 formed so as to extend in the axial direction L. In the present example, as shown in FIG. 1, the magnetic resistance hole 22 is provided so as to penetrate the rotor core 3 in the axial direction L. The magnetic resistance hole 22 functions as a magnetic resistance (a flux barrier) with respect to the magnetic flux flowing in the rotor core 3. That is, the magnetic resistance hole 22 changes a path of a magnetic circuit (a magnetic path) in the rotor core 3 and forms a desired path. Furthermore, the magnetic resistance holes 22 are provided corresponding to each of the plurality of magnetic poles and are provided independently of each other. The rotor core 3 as a whole is provided with a plurality of magnetic resistance holes 22. In addition, the magnetic flux flowing in the rotor core 3 includes the field magnetic flux due to the permanent magnet 11 and the armature magnetic flux due to the coil wound around the stator core 5. Moreover, the magnetic resistance hole 22 includes a hole for mainly controlling the flow of the field magnetic flux so as to suppress a short circuit (the short circuit in the rotor core 3) of the magnetic circuit formed by the permanent magnet 11, and a hole for mainly controlling the flow of the armature magnetic flux.

Each partition P is provided with at least one magnetic resistance hole 22. In the present embodiment, as shown in FIG. 2, each partition P is provided with a plurality (nine in the present example) of magnetic resistance holes 22. Moreover, a specific magnetic resistance hole 22a as the magnetic resistance hole 22 to which the refrigerant is supplied by a radial communication passage 30 (described later) is set for each of the plurality of partitions P (eight partitions in the present example). That is, the rotor core 3 as a whole includes a plurality of specific magnetic resistance holes 22a formed independently of each other. In the present embodiment, the specific magnetic resistance hole 22a corresponds to the "magnetic resistance hole" in the present invention.

As shown in FIG. 2, in each partition P, six of nine magnetic resistance holes 22 are formed integrally with the magnet insertion hole 21 so as to communicate with the magnet insertion hole 21. Meanwhile, the remaining three magnetic resistance holes 22 are formed independently (that is, separately) from the magnet insertion hole 21 without communicating with the magnet insertion hole 21. Moreover, in the present embodiment, the specific magnetic resistance hole 22a is set to the magnetic resistance hole 22 formed most radially inward R1, among the three magnetic resistance holes 22 that are independent from the magnet insertion hole 21.

In the present embodiment, in order to suppress non-uniformity of the temperatures of the plurality of permanent magnets 11 constituting each magnetic pole, the specific magnetic resistance hole 22a is provided in a position at an equal distance from each of the plurality of permanent magnets 11 constituting the corresponding magnetic pole. In addition, in the present specification, as shown in FIG. 2, in a case where, the specific magnetic resistance hole 22a is formed so as to include an equidistant point H at the equal distance from a center G of each permanent magnet 11, on the cross-section perpendicular to the axial direction L, the specific magnetic resistance hole 22a is provided at the equal distance from each of the permanent magnets 11.

Furthermore, in the present embodiment, the specific magnetic resistance hole 22a is formed in a circumferential center portion in the partition P. Moreover, the specific magnetic resistance hole 22a is formed in a line-symmetrical shape as a symmetrical axis of a straight line (identical to the straight line along the radial direction R passing through the equidistance point H, in the present example) along the radial direction R passing through the circumferential center portion on the cross-section perpendicular to the axial direction L.

Furthermore, in the present embodiment, the specific magnetic resistance hole 22a is placed radially inward R1 as a whole with respect to any permanent magnet 11. In the present example, the end portion provided radially outward R2 of the specific magnetic resistance hole 22a and the end portion provided radially inward R1 of the radial region occupied by the permanent magnet 11 are positioned in substantially the same radial direction position. As a result, it is possible to form the radial communication passage 30 extending in the radial direction R, between the specific magnetic resistance hole 22a and the inner peripheral surface of the shaft insertion hole 20 to which the refrigerant is supplied by the refrigerant supply portion 80, while suppressing the influence acting on the flow of the field magnetic flux contributing to the magnet torque. Furthermore, it is also possible to reduce a distance between the portion provided radially outward R2 of the specific magnetic resistance hole 22a through which the refrigerant flows and the permanent magnet 11, and improve the cooling performance of the permanent magnet 11.

Although the details of the configuration of the radial communication passage 30 will be described later, as shown in FIG. 2, the radial communication passage 30 is formed so as to communicate with the specific magnetic resistance hole 22a and the shaft insertion hole 20. As a result, as conceptually shown by a dashed arrow in FIG. 2, the specific magnetic resistance hole 22a is supplied with the refrigerant via the refrigerant supply portion 80 and the radial communication passage 30. In addition, in the present embodiment, by making a flow path cross-sectional area (a cross-sectional area in the cross-section that is cut along a cylindrical surface based on the axial center A) of the radial penetration hole 82 smaller than a flow path cross-sectional area of the radial communication passage 30, it is possible to adjust the flow amount of the refrigerant supplied to the specific magnetic resistance hole 22a by the diameter of the radial penetration hole 82 that is relatively easy to change the design.

The rotor core 3 is provided with a plurality of radial communication passages 30 so as to cause each of the plurality of specific magnetic resistance holes 22a to communicate with the shaft insertion hole 20, and the rotor shaft 10 is provided with a plurality of radial penetration holes 82 corresponding to respective radial communication passages 30. In the present embodiment, one specific magnetic resistance hole 22a is provided in each magnetic pole, and the rotor core 3 includes the radial communication passage 30 as much as the number of magnetic poles (eight in the present example).

Figure 1:
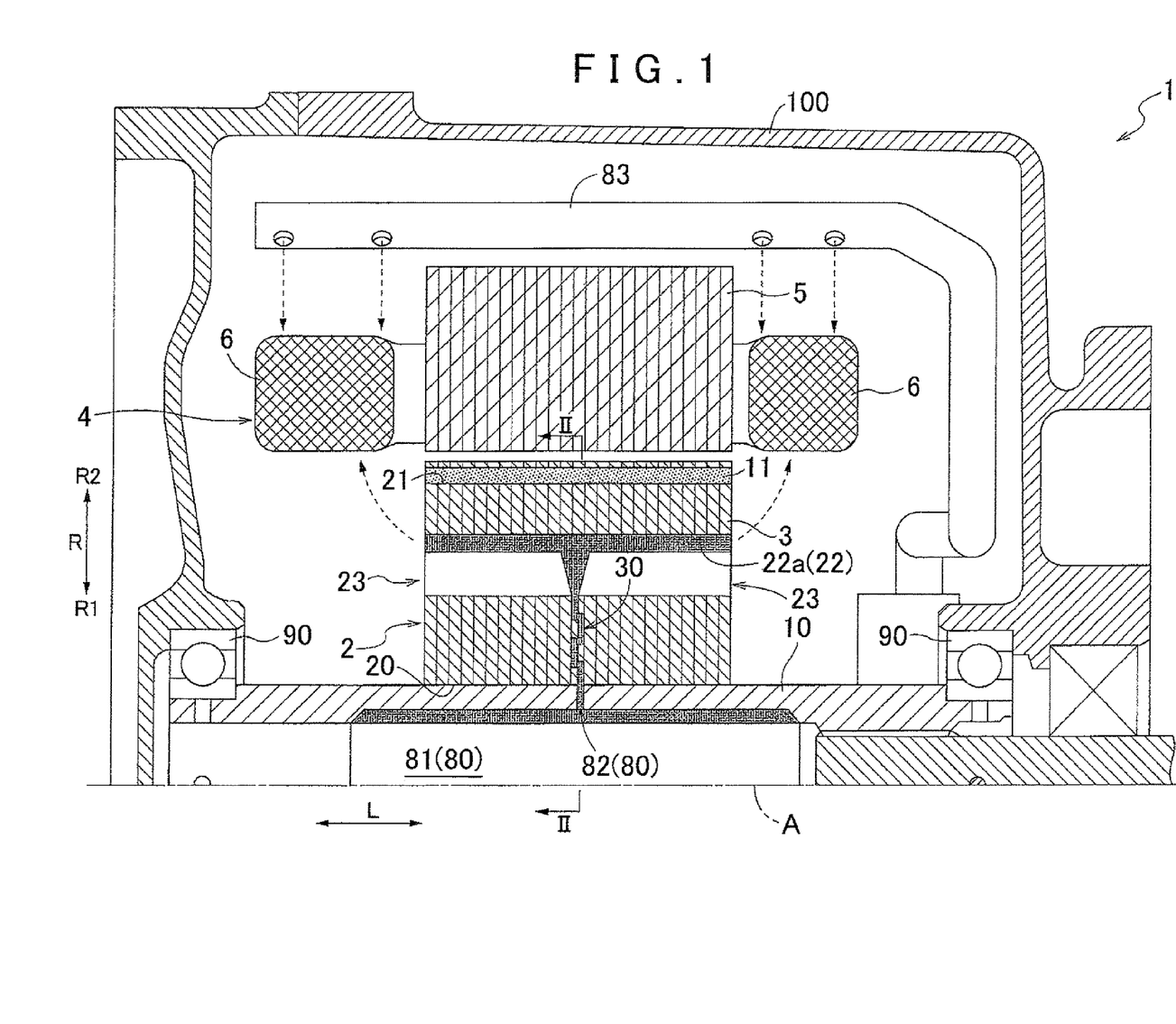
FIG. 1 is a diagram that shows a cross-sectional shape along an axial direction of a portion of a rotating electrical machine according to an embodiment of the present invention.

As shown in FIG. 1, the specific magnetic hole 22a has an end surface opening portion 23 that is open in the end surfaces on both sides of the rotor core 3 in the axial direction. As a result, as shown in FIG. 1, the refrigerant supplied to the specific magnetic resistance hole 22a via the radial communication passage 30 flows in the inner portion of the specific magnetic resistance hole 22a toward both sides thereof in the axial direction. Moreover, the rotor core 3 including the permanent magnet 11 is cooled by the heat exchange performed between the rotor core 3 and the refrigerant in the specific magnetic resistance hole 22a at this time. Moreover, each of the end surface opening portions 23 which are provided on both sides of the rotor core 3 in the axial direction is placed radially inward R1 of the coil end portion 6 which is on the same side of the rotor core 3 in the axial direction L in which the end surface opening portion 23 is provided. As a result, it is possible to discharge the refrigerant reaching the end surface opening portion 23 toward the coil end portion 6 by centrifugal force, as conceptually shown by a dashed arrow in FIG. 1. Thus, it is possible to cool the coil end portion 6 by using the refrigerant after cooling the rotor core 3. In addition, in the present example, a refrigerant supply pipe 83 for supplying the refrigerant from a radially outer side R2 to the coil end portion 6 is also provided in the case 100.

The rotor core 3 having the configuration mentioned above is a stack structure that is formed by stacking a plurality of the magnetic plates 50 having the annular plate shape in the axial direction L. Hereinafter, the configuration and the stacked form of the magnetic plate 50 will be described in detail.

Figure 3:
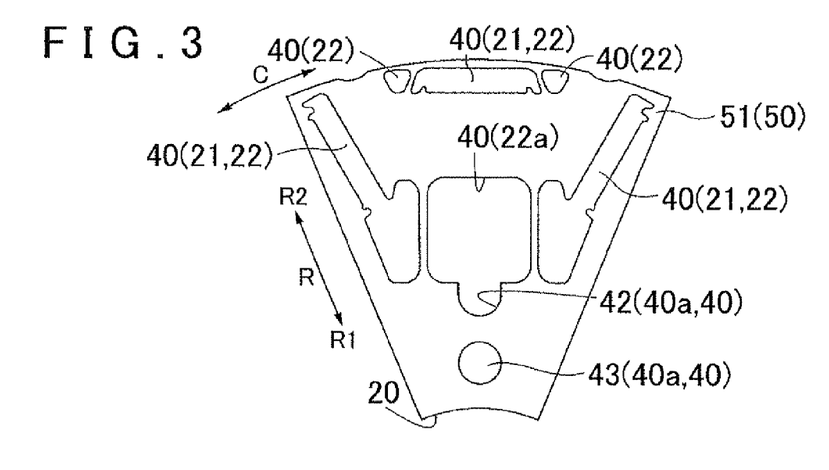
FIG. 3 is a plan view of a portion of a first specific magnetic plate according to the embodiment of the present invention.
Figure 4:
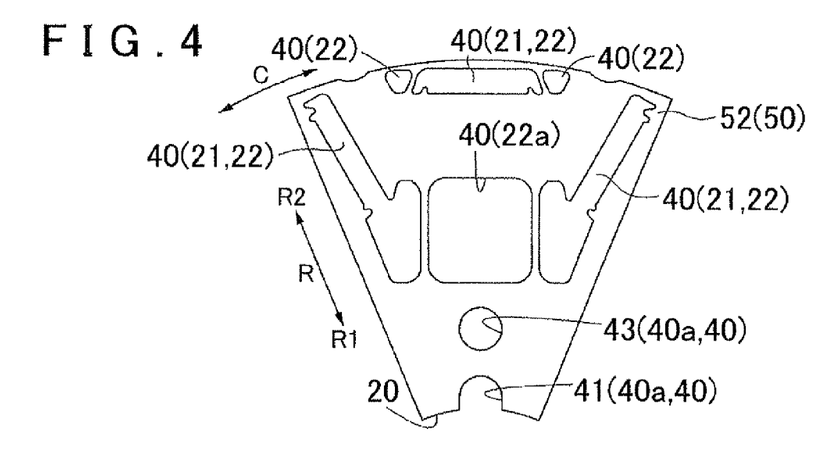
FIG. 4 is a plan view of a portion of a second specific magnetic plate according to the embodiment of the present invention.
Figure 5:
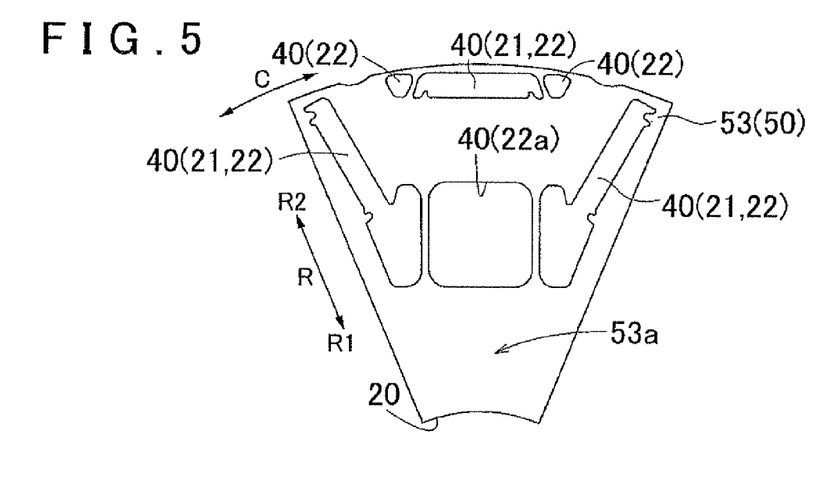
FIG. 5 is a plan view of a portion of a normal magnetic plate according to the embodiment of the present invention.

The plurality of magnetic plates 50 constituting the rotor core 3 has specific magnetic plates (in the present example, two types of a first specific magnetic plate 51 (see FIG. 3) and a second specific magnetic plate 52 (see FIG. 4)) and a normal magnetic plate 53 (see FIG. 5) that is different from the specific magnetic plates. Hereinafter, in a case where there is no need to distinguish the first specific magnetic plate 51 from the second specific magnetic plate 52, the first specific magnetic plate 51 and the second specific magnetic plate 52 are written as "specific magnetic plates 51 and 52". FIGS. 3 to 5 show each only a portion corresponding to one partition P (see FIG. 2) in each magnetic plate 50 formed in an annular plate shape. In the present example, the rotor core 3 is constituted by the specific magnetic plates 51 and 52 and the normal magnetic plate 53. That is, parts of the plurality of magnetic plates 50 constituting the rotor core 3 are the specific magnetic plates 51 and 52, and the remainder thereof is all the normal magnetic plate 53.

As shown in FIGS. 3 to 5, each of the first specific magnetic plate 51, the second specific magnetic plate 52, and the normal magnetic plate 53 is formed with a penetration hole 40 that penetrates the magnetic plate 50 in the axial direction L. The penetration hole 40 for forming the magnet insertion hole 21 and the magnetic resistance hole 22 (including the specific magnetic resistance hole 22a) mentioned above are formed in all of the first specific magnetic plate 51, the second specific magnetic plate 52, and the normal magnetic plate 53. As a result, in the state of stacking the magnetic plate 50 in the axial direction L, the penetration holes 40 formed in the respective magnetic plates 50 communicate with each other in the stacked direction (the axial direction L), whereby the magnet insertion hole 21 and the magnetic resistance hole 22 are formed which extend in the rotor core 3 in the axial direction L.

As shown in FIGS. 3 and 4, the first specific magnetic plate 51 and the second specific magnetic plate 52 are formed with a specific penetration hole 40a which is the penetration hole 40 for forming the radial communication passage 30, in addition to the penetration hole 40 formed in the normal magnetic plate 53. As described below, the radial communication passage 30 is formed by a communication penetration hole group 31 (see FIGS. 6 and 7) constituted by a plurality of the specific penetration holes 40a. In the present embodiment, the specific penetration hole 40a corresponds to the "penetration hole" in the present invention.

As shown in FIGS. 3 and 4, the specific penetration hole 40a is formed between the shaft insertion hole 20 and the specific magnetic resistance hole 22a in the radial direction R. Specifically, the specific penetration hole 40a is formed in a portion of a region in the radial direction R between the shaft insertion hole 20 and the specific magnetic resistance hole 22a. Furthermore, in the present embodiment, the specific penetration hole 40a is formed in the circumferential center portion of the partition P, and the extending direction of the radial communication passage 30 formed so as to extend in the radial direction R is a direction parallel to the radial direction R.

The specific penetration hole 40a includes an inner opening penetration hole 41 which is open radially inward R1 and communicates with the shaft insertion hole 20, an outer opening penetration hole 42 which is open radially outward R2 and communicates with the specific magnetic resistance hole 22a, and a full penetration hole 43 which does not communicate with the shaft insertion hole 20 and the specific magnetic resistance hole 22a and has a closed shape surrounded by the plate-shaped portion in the entire circumference.

Moreover, in the present embodiment, the inner opening penetration hole 41 is formed in the second specific magnetic plate 52, and the outer opening penetration hole 42 is formed in the first specific magnetic plate 51. That is, the inner opening penetration hole 41 and the outer opening penetration hole 42 are formed in the different specific magnetic plates 51 and 52. Furthermore, in the present embodiment, the shape of the inner opening penetration hole 41 as viewed in the axial direction and the shape of the outer opening penetration hole 42 as viewed in the axial direction are each a shape in which an arc is connected to a straight line. Furthermore, the shape of the full penetration hole 43 as viewed in the axial direction is a circular shape.

Figures 6A, 6B:
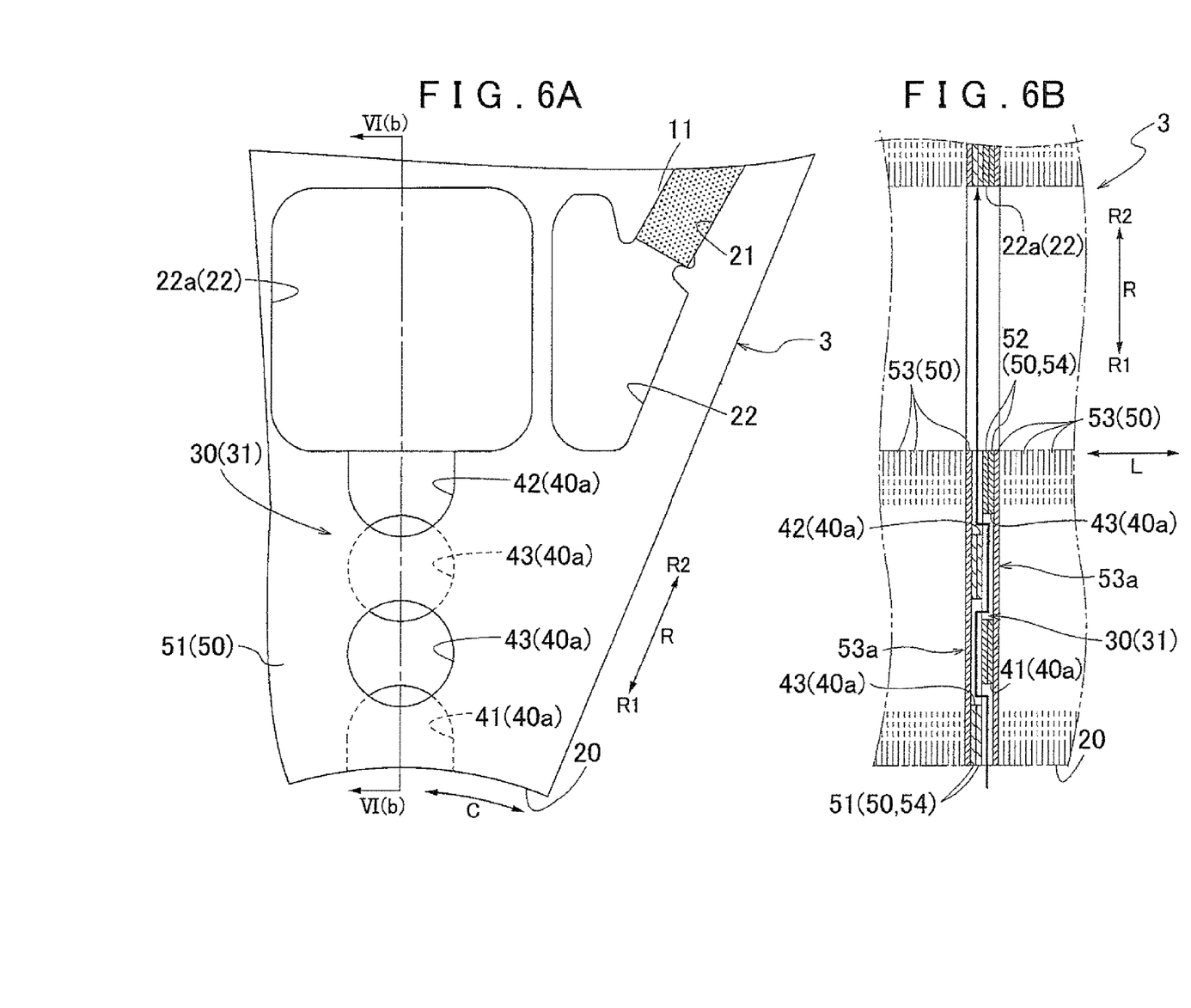
FIGS. 6A and 6B are cross-sectional views of a portion of a rotor core according to the embodiment of the present invention.
Figure 7:
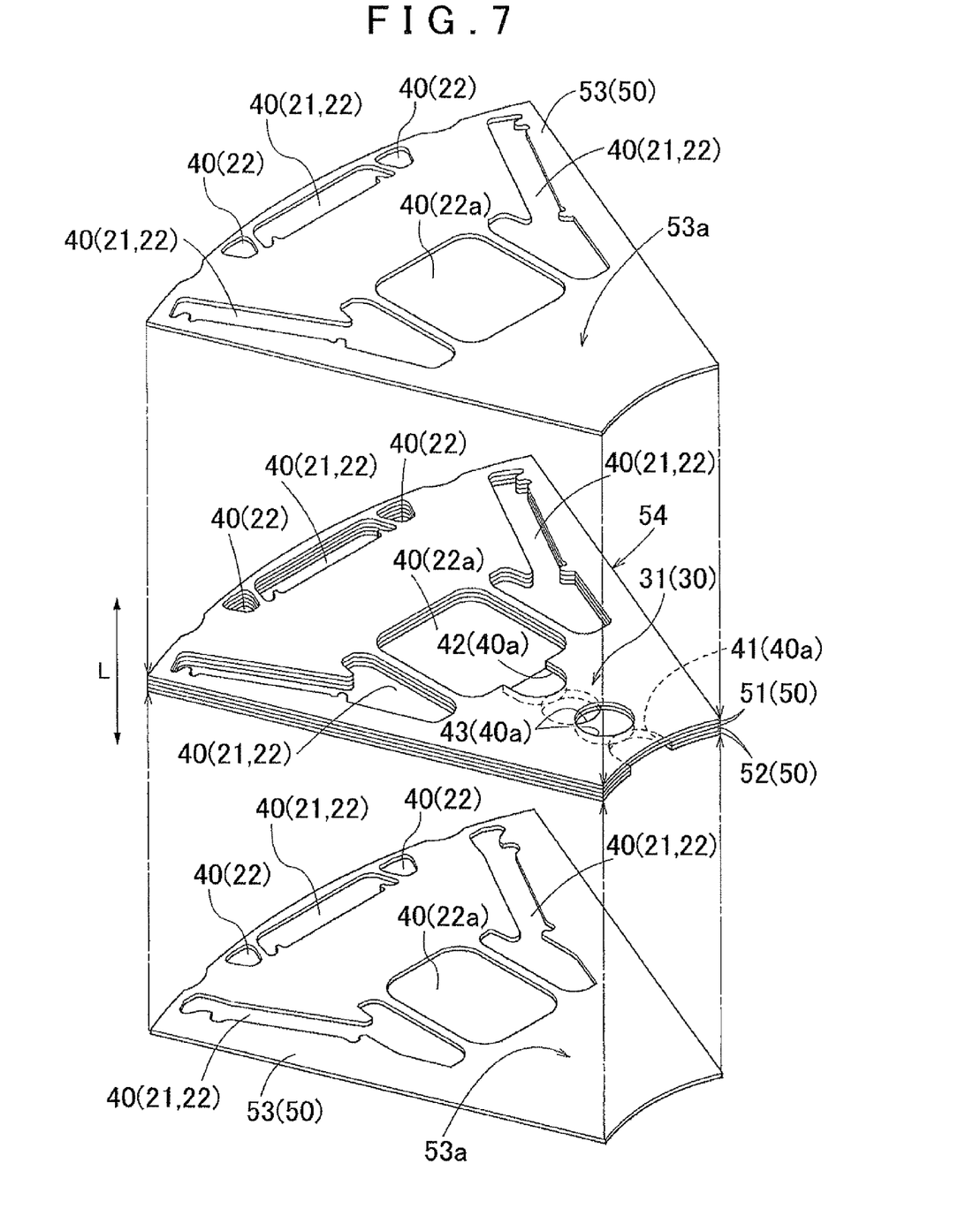
FIG. 7 is an exploded perspective view of a portion of the rotor core according to the embodiment of the present invention.

As shown in FIGS. 6 and 7, the communication penetration hole group 31, which is the group of the plurality of specific penetration holes 40a forming the radial communication passage 30, is formed by a specific magnetic plate group 54 formed by stacking at least two specific magnetic plates 51 and 52 in the axial direction L. Herein, one magnetic plate 50 is not necessarily physically configured by one circular plate-shaped member, but one magnetic plate 50 may be configured by superimposing a plurality of circular plate-shaped members of the same shape by the same phase in the axial direction L.

The specific penetration hole 40a constituting the communication penetration hole group 31 includes at least the inner opening penetration hole 41 and the outer opening penetration hole 42, and also includes the full penetration hole 43 in the present example. Moreover, the plurality of specific penetration holes 40a constituting the communication penetration hole group 31 is formed divided into at least two specific magnetic plates 51 and 52 constituting the specific magnetic plate group 54, and the plurality of specific penetration holes 40a is placed so that at least portions of specific penetration holes 40a are different from each other in radial position and partially overlap each other as viewed in the axial direction so as to be able to sequentially communicate in the radial direction R from the shaft insertion hole 20 (the inner opening penetration hole 41) to the specific magnetic resistance hole 22a (the outer opening penetration hole 42). In other words, the stacking sequence of the specific magnetic plates 51 and 52 in the specific magnetic plate group 54 is set so that two continuous specific penetration holes 40a in the communication order of the radial direction R in the communication penetration hole group 31 are placed divided into the two specific magnetic plates 51 and 52 adjacent to each other in the axial direction L, and the specific penetration hole 40a on the downstream side (the outer opening penetration hole 42 side) is positioned radially outward R2 of the specific penetration hole 40a on the upstream side (the inner opening penetration hole 41 side).

Providing the configuration as mentioned above makes it possible to reduce the size (particularly, the size in the radial direction R) of the specific penetration hole 40a formed in the specific magnetic plates 51 and 52, whereby it is possible to form the radial communication passage 30, while suitably securing the strength of the respective specific magnetic plates 51 and 52 constituting the rotor core 3.

In the present embodiment, as shown in FIG. 6B, the specific magnetic plate group 54 is constituted by four specific magnetic plates 51 and 52. Specifically, the specific magnetic plate group 54 is formed by stacking a first unit, which is formed by stacking a plurality (two in the present example) of the first specific magnetic plates 51 in the same phase in the axial direction L, and a second unit, which is formed by a plurality (two in the present example) of the second specific magnetic plates 52 in the same phase in the axial direction L, in the axial direction L. For that reason, in the present embodiment, the path of the radial communication passage 30 formed by the communication penetration hole group 31 includes a portion in which the specific penetration holes 40a which are formed in two specific magnetic plates 51 and 52 adjacent to each other in the axial direction L are shifted toward each other in the radial direction R so as to communicate with each other in the axial direction L only in a partial region in the radial direction R, in addition to a portion in which the specific penetration holes 40a which are formed in the two specific magnetic plates 51 and 52 adjacent to each other in the axial direction L are placed in the same position in the radial direction R so as to communicate with each other in the axial direction L in an entire region in the radial direction R. In addition, the former portion is formed in a boundary portion (a boundary portion between the first unit and the second unit) between the first specific magnetic plate 51 and the second specific magnetic plate 52, and the latter portion is formed in a boundary portion between the first specific magnetic plates 51 in the first unit and in a boundary portion between the second specific magnetic plates 52 in the second unit.

Moreover, the normal magnetic plates 53 are placed on both sides of the specific magnetic plate group 54 in the axial direction L such that the specific magnetic plate group 54 is interposed between the normal magnetic plates 53, as shown in FIGS. 6 and 7. The normal magnetic plate 53 has a blocking portion 53a which blocks the specific penetration hole 40a in a position overlapping with the specific penetration hole 40a as viewed in the axial direction. As a result, both sides of the radial communication passage 30 in the axial direction L, which is formed by the communication penetration hole group 31 and communicates the shaft insertion hole 20 with the specific magnetic resistance hole 22a, are blocked by the normal magnetic plate 53, and the radial communication passage 30 is able to suitably supply the refrigerant supplied from the refrigerant supply portion 80 (see FIG. 2) to the specific magnetic resistance hole 22a. In addition, in the present embodiment, as shown in FIG. 5, the normal magnetic plate 53 includes a plate-like portion extending over an entire region in the radial direction R between the shaft insertion hole 20 and the specific magnetic resistance hole 22a, and the plate-like portion constitutes the blocking portion 53a.

In the present embodiment, only one specific magnetic plate group 54 is provided in the axial center portion of the rotor core 3, and as shown in FIGS. 1 and 2, one radial communication passage 30 is formed for each of the plurality (eight in the present example) of specific magnetic resistance holes 22a in the axial center portion of the rotor core 3. Moreover, as is apparent from FIGS. 1 and 6B, the number of normal magnetic plates 53 constituting the rotor core 3 is greater than the number (four in the present example) of the specific magnetic plates 51 and 52 constituting the rotor core 3. Moreover, as the ratio of the number of normal magnetic plates 53 to the number of specific magnetic plates 51 and 52 increases, the strength of the rotor core 3 can be improved. For example, the number of normal magnetic plates 53 can be about 20 to 30 times the number of specific magnetic plates 51 and 52. In addition, in a case where the thickness in the axial direction L of each of the specific magnetic plates 51 and 52 is different from that of the normal magnetic plate 53*a*, the number of specific magnetic plates 51 and 52 and the number of normal magnetic plates 53*a*, which are converted such that the thickness of each of the specific magnetic plates 51 and 52 and that of the normal magnetic plate 53*a* are equal to each other, are compared to each other.

3. Other Embodiments

Finally, other embodiments of the rotating electrical machine according to the present invention will be described. In addition, configurations disclosed in the respective embodiments described below can also be applied by being combined with the configurations disclosed in other embodiments unless an inconsistency occurs.

(1) In the embodiment mentioned above, a configuration has been described, as an example, in which each of the plurality of magnetic poles is formed by three permanent magnets 11. However, the embodiment of the present invention is not limited thereto, but it is also possible to adopt a configuration in which one magnetic pole is formed by the plurality of permanent magnets 11 other than "three", and a configuration in which one magnetic pole is formed by one permanent magnet 11.

Figure 8:
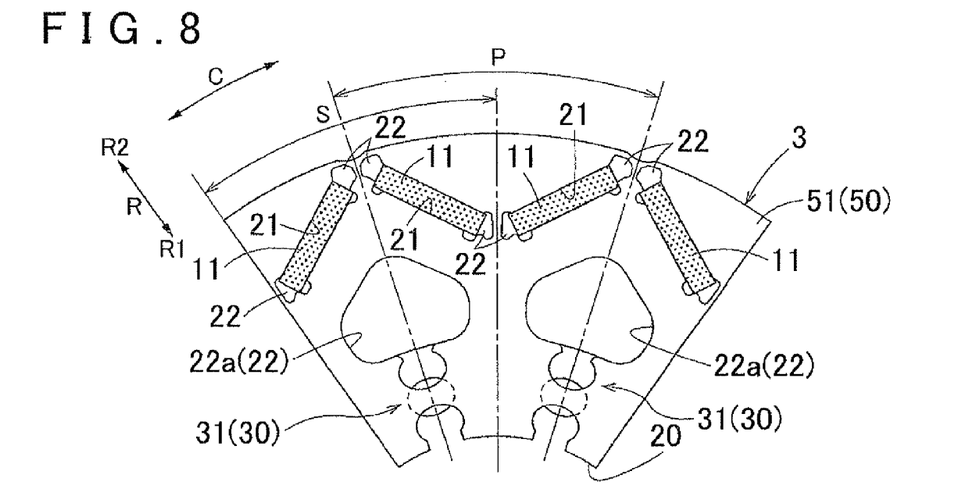
FIG. 8 is a diagram that shows a cross-sectional shape perpendicular to the axial direction of a portion of the rotor core according to another embodiment of the present invention.
Figure 9:
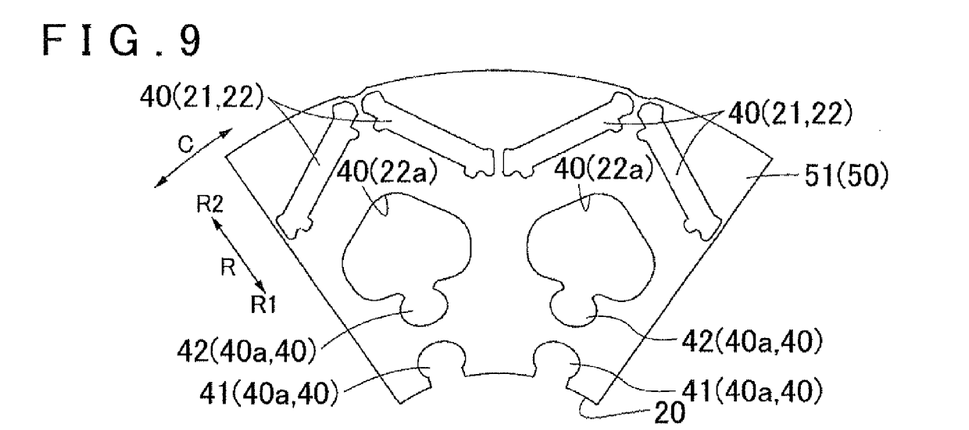
FIG. 9 is a plan view of a portion of a first specific magnetic plate according to another embodiment of the present invention.
Figure 10:
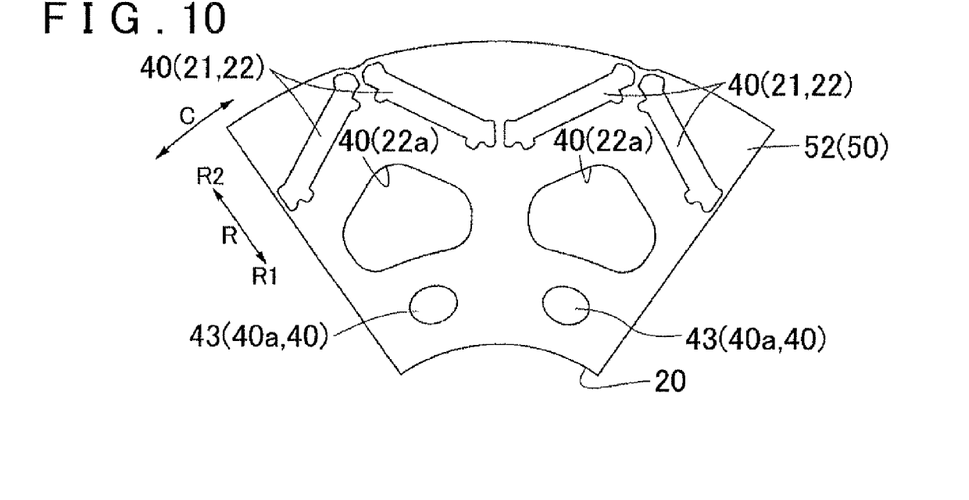
FIG. 10 is a plan view of a portion of a second specific magnetic plate according to another embodiment of the present invention.

FIG. 8 shows a configuration, as an example, in which the one magnetic pole is formed by two permanent magnets 11. In addition, similar to FIG. 2, in FIG. 8, a region (a partition) in the circumferential direction C constituting one magnetic pole is indicated by a symbol "P". Even in the present example, similar to the embodiment mentioned above, the rotor core 3 is formed by using two types of specific magnetic plates of the first specific magnetic plate 51 (see FIG. 9) and the second specific magnetic plate 52 (see FIG. 10).

In an example shown in FIG. 8, unlike the embodiment mentioned above, the specific magnetic resistance hole 22*a* is not provided in a position at an equal distance from each of the plurality of permanent magnets 11 constituting the corresponding magnetic pole, but is formed so as to span a boundary portion between the two partitions P adjacent to each other in the circumferential direction C. Specifically, in the present example, the specific magnetic resistance hole 22*a* is provided in a position at an equal distance from each of the plurality (two in the present example) of permanent magnets 11 included in a partition S which is formed by shifting the partition P by a half pitch of the partition P (a half of the circumferential range occupied by the partition P) in the circumferential direction C. In addition, even in an example shown in FIG. 8, in the whole rotor core 3, a plurality (specifically, the same number as that of the magnetic pole) of specific magnetic resistance holes 22*a* is provided corresponding to each of the plurality of magnetic poles.

Furthermore, in an example shown in FIG. 8, unlike the embodiment mentioned above, the inner opening penetration hole 41 and the outer opening penetration hole 42 are formed in the first specific magnetic plate 51 (see FIG. 9) which is the same specific magnetic plate. In addition, in an example shown in FIG. 8, unlike the embodiment mentioned above, a shape of the full penetration hole 43 as viewed in the axial direction is not a circular shape but an elliptical shape, specifically, an elliptical shape in which a direction of a longer axis of an ellipse coincides with the circumferential direction C (see FIG. 10). In addition, a shape of specific penetration holes 40*a* as viewed in the axial direction is not limited to a circular shape, an elliptical shape and a shape in which an arc is connected to a straight line, but can also be a shape in which only the straight lines are connected to each other (for example, a triangular shape, a rectangular shape or the like).

(2) In the embodiment mentioned above, a configuration has been described, as an example, in which the radial communication passage 30 is formed in the axial center portion of the rotor core 3. However, the embodiment of the present invention is not limited thereto, but a configuration can also be adopted in which the radial communication passage 30 is formed in a position shifted from the axial center portion of the rotor core 3 to either of the sides in the axial direction L. For example, a configuration can be adopted in which the radial communication passage 30 is formed in the axial direction end portion of the rotor core 3. In such a configuration, unlike the embodiment mentioned above, a configuration can be adopted in which the end surface opening portion 23 of the specific magnetic resistance hole 22*a* is provided only in an end surface of the specific magnetic resistance hole 22*a* on a side opposite to the side where the radial communication passage 30 is formed in the axial direction L.

(3) In the embodiment mentioned above, a configuration has been described, as an example, in which the radial communication passages 30 corresponding to respective specific magnetic resistance holes 22*a* are formed in the same position (specifically, the axial center portion of the rotor core 3) in the axial direction L. However, the embodiment of the present invention is not limited thereto, but a configuration can be adopted in which the radial communication passages 30 corresponding to at least two specific magnetic resistance holes 22*a* are formed in the different positions in the axial direction L. In such a configuration, unlike the embodiment mentioned above, the specific penetration hole 40*a* for forming the radial communication passage 30 is provided in the specific magnetic plates 51 and 52 only in the number of partitions P which is smaller than the number of magnetic poles.

(4) In the embodiment mentioned above, a configuration has been described, as an example, in which one radial communication passage 30 is formed for each of the plurality of specific magnetic resistance holes 22*a*. However, the embodiment of the present invention is not limited thereto, but a configuration can also be adopted in which the specific magnetic plate groups 54 are provided in a plurality of locations of the rotor core 3 in the axial direction L, and the plurality of radial communication passages 30, which are formed in the different positions in the axial direction L, are formed for one specific magnetic resistance hole 22*a*. Even in such a case, it is desirable that the number of normal magnetic plates 53 constituting the rotor core 3 be greater than the number of specific magnetic plates 51 and 52 constituting the rotor core 3. In addition, it is also possible to adopt a configuration in which the number of normal magnetic plates 53 constituting the rotor core 3 is smaller than the number of specific magnetic plates 51 and 52 constituting the rotor core 3.

(5) In the embodiment mentioned above, a configuration has been described, as an example, in which the specific magnetic plate group 54 is constituted by two types of specific magnetic plates of the first specific magnetic plate 51 and the second specific magnetic plate 52. However, the embodiment of the present invention is not limited thereto, but a configuration can also be adopted in which the specific magnetic plate group 54 is formed by three types or more (for example, three types) of specific magnetic plates. Increasing the types of the specific magnetic plate makes it easy to flow the refrigerant in the radial communication passage 30.

Furthermore, it is also possible to adopt a configuration in which the specific magnetic plate group 54 is formed, by stacking the plurality of specific magnetic plates out of phase in the axial direction L, using only one type of specific magnetic plate formed with the plurality of partitions P in which the forming positions (the position in the radial direction R) of the specific penetration hole 40a are different from each other. In this case, for example, it is also possible to adopt a configuration in which the specific magnetic plate group 54 is formed so as to have a portion in which two specific magnetic plates are shifted by 45° in the circumferential direction C and are stacked in the axial direction L, using the specific magnetic plate having the configuration in which the partition P shown in FIG. 3 and the partition P shown in FIG. 4 are arranged alternately along the circumferential direction C.

(6) In the embodiment mentioned above, a configuration has been described, as an example, in which the specific penetration hole 40a constituting the communication penetration hole group 31 also includes the full penetration hole 43, in addition to the inner opening penetration hole 41 and the outer opening penetration hole 42. However, the embodiment of the present invention is not limited thereto, but, as a configuration in which the end portion provided radially outward R2 of the inner opening penetration hole 41 is positioned radially outward R2 of the end portion provided radially inward R1 of the outer opening penetration hole 42, the communication penetration hole group 31 may be formed only by the inner opening penetration hole 41 and the outer opening penetration hole 42.

(7) In the embodiment mentioned above, a configuration has been described, as an example, in which each of the specific penetration holes 40a is formed in the circumferential center portion in the partition P, and the extending direction of the radial communication passage 30 formed so as to extend in the radial direction R is a direction that is parallel to the radial direction R. However, the embodiment of the present invention is not limited thereto, but it is also possible to adopt a configuration in which at least a portion of the specific penetration holes 40a is formed in a position different from the circumferential center portion in the partition P, and the extending direction of the radial communication passage 30 is a direction that intersects with the radial direction R.

(8) In the embodiment mentioned above, as shown in FIG. 1, a configuration has been described, as an example, in which an end plate is not provided with the end surfaces on both sides of the rotor core 3 in the axial direction. However, the embodiment of the present invention is not limited thereto, but it is also possible to adopt a configuration in which an end plate having a plate-like portion overlapping with the magnet insertion hole 21 as viewed in the axial direction is provided in one or both of the end surfaces of the rotor core 3 in the axial direction L. In such a configuration, it is preferable to adopt a configuration in which the end plate has the penetration hole extending in the axial direction L at least in a position corresponding to the end surface opening portion 23 of the specific magnetic resistance hole 22a so as to allow the refrigerant supply to the coil end portion 6.

(9) The embodiments disclosed in the present specification are examples in all respects regarding other configurations, and the embodiments of the present invention are not limited thereto. That is, it is also possible to suitably modify configurations, which are not described in the claims of the present invention, within the scope that does not depart from the object of the present invention.

The present invention can be suitably used in the rotating electrical machine that includes a rotor which has a rotor core formed by stacking a plurality of magnetic plates having an annular plate shape in an axial direction, a permanent magnet inserted into a magnet insertion hole formed in the rotor core, and a rotor shaft inserted into a shaft insertion hole surrounded by an inner peripheral surface of the rotor core, and a stator.

What is claimed is:

1. A rotating electrical machine that includes a rotor which has a rotor core formed by stacking a plurality of magnetic plates having an annular plate shape in an axial direction, a plurality of permanent magnets with a permanent magnet inserted into a magnet insertion hole of a plurality of magnet insertion holes formed in the rotor core, and a rotor shaft which is inserted into a shaft insertion hole surrounded by an inner peripheral surface of the rotor core; and a stator, wherein:

the rotor includes a plurality of magnet poles which includes the plurality of permanent magnets, extends in the axial direction, and is arranged dispersed in a circumferential direction;

the rotor core includes a plurality of specific magnetic resistance holes which is formed corresponding to respective magnetic poles so as to extend in the axial direction and functions as the magnetic resistance to the magnetic flux flowing in the rotor core, and a radial communication passage which extends in a radial direction so as to communicate each of the plurality of specific magnetic resistance holes and the shaft insertion hole;

a region in the circumferential direction that forms one magnetic pole in the rotor core is defined as a partition;

a specific magnetic resistance hole in the partition of the plurality of specific magnetic resistance holes is formed independently from magnet insertion holes in the partition of the plurality of magnetic insertion holes and the specific magnetic resistance hole is at an equal distance from each of permanent magnets in the partition of the plurality of permanent magnets;

the specific magnetic resistance holes are placed so that each of an end surface on a radially outward side of the specific magnetic resistance holes overlap with the plurality of permanent magnets in the radial direction or is placed radially inward of the plurality of permanent magnets;

a specific magnetic plate, which is a portion of the plurality of magnetic plates of the rotor core, includes a penetration hole which is formed in a radial region between the shaft insertion hole and the specific magnetic resistance hole and penetrates in the axial direction; and the radial communication passage is formed by a communication penetration hole group that is formed by sequentially communicating a plurality of the penetration holes from the shaft insertion hole to the specific magnetic resistance hole in the radial direction, the plurality of the penetration holes formed divided into at least the two specific magnetic plates and formed such that the radial positions of the penetration holes are different from each other and the penetration holes partially overlap each other when viewed in the axial direction.

2. The rotating electrical machine according to claim 1, wherein the specific magnetic resistance holes are configured so as to supply refrigerant via the radial communication passage and the penetration hole of which a flow path cross-sectional area is made smaller than a flow path cross-sectional area of the radial communication passage.

3. A rotating electrical machine that includes a rotor which has a rotor core formed by stacking a plurality of magnetic plates having an annular plate shape in an axial direction, a plurality of permanent magnets with a permanent magnet inserted into a magnet insertion hole of a plurality of magnet insertion holes formed in the rotor core, and a rotor shaft which is inserted into a shaft insertion hole surrounded by an inner peripheral surface of the rotor core; and a stator, wherein:
    the rotor includes a plurality of magnet poles which includes the plurality of permanent magnets, extends in the axial direction, and is arranged dispersed in a circumferential direction;
    the rotor core includes a plurality of specific magnetic resistance holes which is formed corresponding to respective magnetic poles so as to extend in the axial direction and functions as the magnetic resistance to the magnetic flux flowing in the rotor core, and a radial communication passage which extends in a radial direction so as to communicate each of the plurality of specific magnetic resistance holes and the shaft insertion hole;
    a region in the circumferential direction that forms one magnetic pole in the rotor core is defined as a partition;
    in a second partition that is formed by shifting the partition by a half pitch of the partition in the circumferential direction, a specific magnetic resistance hole in the second partition of the plurality of specific magnetic resistance holes is formed independently from magnet insertion holes in the second partition of the plurality of magnetic insertion holes and the specific magnetic resistance hole is at an equal distance from each of permanent magnets in the second partition of the plurality of permanent magnets;
    the specific magnetic resistance holes are placed so that each of an end surface on a radially outward side of the specific magnetic resistance holes overlap with the plurality of permanent magnets in the radial direction or is placed radially inward of the plurality of permanent magnets;
    a specific magnetic plate, which is a portion of the plurality of magnetic plates of the rotor core, includes a penetration hole which is formed in a radial region between the shaft insertion hole and the specific magnetic resistance hole and penetrates in the axial direction; and
    the radial communication passage is formed by a communication penetration hole group that is formed by sequentially communicating a plurality of the penetration holes from the shaft insertion hole to the specific magnetic resistance hole in the radial direction, the plurality of the penetration holes formed divided into at least two specific magnetic plates and formed such that the radial positions of the penetration holes are different from each other and the penetration holes partially overlap each other when viewed in the axial direction.

4. The rotating electrical machine according to claim 3, wherein:
    the plurality of magnetic plates of the rotor core includes the specific magnetic plate, and a normal magnetic plate that is different from the specific magnetic plate;
    the normal magnetic plate has a blocking portion that blocks the penetration hole in a position overlapping with the penetration hole when viewed in the axial direction;
    the communication penetration hole group is formed by a specific magnetic plate group which is formed by stacking at least the two specific magnetic plates in the axial direction, and the normal magnetic plate is placed on both sides of the specific magnetic plate group in the axial direction such that the specific magnetic plate group is interposed between the normal magnetic plates; and
    the number of normal magnetic plates is greater than that of specific magnetic plates.

5. The rotating electrical machine according to claim 3, wherein
    the radial communication passage is formed for each of the plurality of specific magnetic resistance holes in a center portion in the axial direction of the rotor core.

6. The rotating electrical machine according to claim 3, wherein:
    each of the penetration holes is formed in a portion of a radial region between the shaft insertion hole and the specific magnetic resistance hole;
    the communication penetration hole group includes an inner opening penetration hole as the penetration hole which is open radially inward and communicates with the shaft insertion hole, and an outer opening penetration hole as the penetration hole which is open radially outward and communicates with the specific magnetic resistance hole; and
    the inner opening penetration hole and the outer opening penetration hole are formed in the different specific magnetic plates.

7. The rotating electrical machine according to claim 3, wherein
    a shape of the penetration hole when viewed in the axial direction is any one of a circular shape, an elliptical shape, and a shape in which an arc is connected to a straight line.

8. The rotating electrical machine according to claim 3, wherein:
    the stator includes a stator core which is placed radially outward of the rotor core, and a coil end portion which projects from the stator core toward both sides in the axial direction of the stator core; and
    the specific magnetic resistance hole has an end surface opening portion that is open to end surfaces of the rotor core on both sides in the axial direction of the rotor core.

9. The rotating electrical machine according to claim 4, wherein
    the radial communication passage is formed for each of the plurality of specific magnetic resistance holes in a center portion in the axial direction of the rotor core.

10. The rotating electrical machine according to claim 9, wherein:
    each of the penetration holes is formed in a portion of a radial region between the shaft insertion hole and the specific magnetic resistance hole;
    the communication penetration hole group includes an inner opening penetration hole as the penetration hole which is open radially inward and communicates with the shaft insertion hole, and an outer opening penetration hole as the penetration hole which is open radially outward and communicates with the specific magnetic resistance hole; and
    the inner opening penetration hole and the outer opening penetration hole are formed in the different specific magnetic plates.

11. The rotating electrical machine according to claim 10, wherein
    a shape of the penetration hole when viewed in the axial direction is any one of a circular shape, an elliptical shape, and a shape in which an arc is connected to a straight line.

12. The rotating electrical machine according to claim 4, wherein:
- each of the penetration holes is formed in a portion of a radial region between the shaft insertion hole and the specific magnetic resistance hole;
- the communication penetration hole group includes an inner opening penetration hole as the penetration hole which is open radially inward and communicates with the shaft insertion hole, and an outer opening penetration hole as the penetration hole which is open radially outward and communicates with the specific magnetic resistance hole; and
- the inner opening penetration hole and the outer opening penetration hole are formed in the different specific magnetic plates.

13. The rotating electrical machine according to claim 4, wherein
- a shape of the penetration hole when viewed in the axial direction is any one of a circular shape, an elliptical shape, and a shape in which an arc is connected to a straight line.

14. The rotating electrical machine according to claim 5, wherein
- a shape of the penetration hole when viewed in the axial direction is any one of a circular shape, an elliptical shape, and a shape in which an arc is connected to a straight line.

15. The rotating electrical machine according to claim 9, wherein
- a shape of the penetration hole when viewed in the axial direction is any one of a circular shape, an elliptical shape, and a shape in which an arc is connected to a straight line.

16. The rotating electrical machine according to claim 12, wherein
- a shape of the penetration hole when viewed in the axial direction is any one of a circular shape, an elliptical shape, and a shape in which an arc is connected to a straight line.

17. The rotating electrical machine according to claim 6, wherein
- a shape of the penetration hole when viewed in the axial direction is any one of a circular shape, an elliptical shape, and a shape in which an arc is connected to a straight line.

18. The rotating electrical machine according to claim 3, wherein
- the specific magnetic resistance holes are configured so as to supply refrigerant via the radial communication passage and the penetration hole of which a flow path cross-sectional area is made smaller than a flow path cross-sectional area of the radial communication passage.

* * * * *